(12) United States Patent
Dusad et al.

(10) Patent No.: US 11,405,506 B2
(45) Date of Patent: Aug. 2, 2022

(54) PROMPT FEATURE TO LEAVE VOICEMAIL FOR APPROPRIATE ATTRIBUTE-BASED CALL BACK TO CUSTOMERS

(71) Applicant: Avaya Management L.P., Santa Clara, CA (US)

(72) Inventors: Manish Dusad, Galway (IE); Kazim Hussain, Galway (IE)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/915,573

(22) Filed: Jun. 29, 2020

(65) Prior Publication Data

US 2021/0409546 A1 Dec. 30, 2021

(51) Int. Cl.
*H04M 3/523* (2006.01)
*H04M 3/533* (2006.01)
*H04M 3/42* (2006.01)

(52) U.S. Cl.
CPC ..... *H04M 3/5231* (2013.01); *H04M 3/42059* (2013.01); *H04M 3/5233* (2013.01); *H04M 3/53333* (2013.01); *H04M 2203/558* (2013.01); *H04M 2242/12* (2013.01)

(58) Field of Classification Search
CPC ............ H04M 3/5231; H04M 3/5233; H04M 3/42059; H04M 3/53333; H04M 2242/12; H04M 2203/558
See application file for complete search history.

(56) References Cited

U.S. PATENT DOCUMENTS

| | | | | |
|---|---|---|---|---|
| 5,625,748 | A * | 4/1997 | McDonough | G10L 15/1822 704/236 |
| 7,023,979 | B1 * | 4/2006 | Wu | H04M 3/5233 379/265.11 |
| 7,110,525 | B1 * | 9/2006 | Heller | H04M 3/523 379/265.11 |
| 8,103,508 | B2 | 1/2012 | Lord | |
| 8,386,265 | B2 | 2/2013 | Subramanian et al. | |
| 8,634,543 | B2 | 1/2014 | Flockhart et al. | |
| 10,827,072 | B1 * | 11/2020 | Deole | H04M 3/5235 |
| 11,170,761 | B2 * | 11/2021 | Thomson | G10L 15/22 |
| 2004/0141508 | A1 * | 7/2004 | Schoeneberger | H04L 67/10 370/401 |
| 2010/0235218 | A1 | 9/2010 | Erhart et al. | |
| 2010/0296417 | A1 | 11/2010 | Steiner | |
| 2011/0125793 | A1 | 5/2011 | Erhart et al. | |
| 2011/0125826 | A1 | 5/2011 | Erhart et al. | |
| 2014/0153703 | A1 | 6/2014 | Desai et al. | |
| 2015/0117632 | A1 * | 4/2015 | Konig | H04M 3/5166 379/265.12 |

(Continued)

*Primary Examiner* — Lisa Hashem
(74) *Attorney, Agent, or Firm* — Sheridan Ross P.C.

(57) ABSTRACT

Systems and methods are provided for attribute-based client callbacks. A client is prompted to leave a voice message. Attributes are extracted from the voice message and, based on the attributes, tokens created for the selection of an appropriate agent is connected to the client, such as having skills or attributes matching one or more tokens. A callback application server transmits prompts and receives requests for client callbacks. an interaction manager determines agent availability and arranges callback handling, and a session management server initiates callbacks to connect the selected agent with the client.

20 Claims, 5 Drawing Sheets

(56) References Cited

U.S. PATENT DOCUMENTS

| | | | | |
|---|---|---|---|---|
| 2019/0014213 | A1* | 1/2019 | Kumar | G16H 20/10 |
| 2019/0325288 | A1* | 10/2019 | Oyenan | H04M 3/42195 |
| 2020/0288011 | A1* | 9/2020 | Petty | H04M 3/436 |
| 2021/0044943 | A1* | 2/2021 | Chu | H04W 4/16 |
| 2021/0133763 | A1* | 5/2021 | Adibi | H04M 3/5237 |
| 2021/0203781 | A1* | 7/2021 | Quilici | H04M 3/42059 |
| 2021/0352177 | A1* | 11/2021 | DiMaria | H04M 3/5191 |

* cited by examiner

PROMPT FEATURE TO LEAVE VOICEMAIL FOR APPROPRIATE ATTRIBUTE-BASED CALL BACK TO CUSTOMERS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for automating node-to-node connections and particularly to automating node-to-node connections when a first connection attempt fails.

BACKGROUND

Typically, if a client calls a business, an Interactive Voice Response (IVR) menu is presented with choices that enable the calling client to identify an issue for which the client requires service. The client can be placed in queue to wait for a service agent capable of handling the issue. It is expected that clients who identify the purpose of their call. For example, they will say, "account opening issue" and will then be queued for, and connected to, a service agent with the ability to handle account opening issues. Similarly, it is expected that clients who identify the purpose of their call as a "service down issue" will be queued for, and connected to, a service agent with the ability to handle client service issues.

For many applications, the voice prompt menus used to channel calling clients into a queue for an appropriate group of service agents can be exacerbating. It may take significant time to navigate layered menus of voice prompts and client often hang up or get lost in IVR menus, leading to frustration and negative attitude towards the enterprise they are seeking to interact with. Additionally, spending time waiting on hold for a service agent may be exacerbating, especially if the calling client who may want to leave a voice message.

SUMMARY

These and other needs are addressed by the various embodiments and configurations of the present invention. The present invention can provide a number of advantages depending on the particular configuration. These and other advantages will be apparent from the disclosure of the invention(s) contained herein.

As an overview, and in one embodiment, an alternative is provided to navigating a decision tree of options in an IVR only to be placed in queue for an agent, hopefully without any errors and ending up in the wrong queue. Clients may call and partially or entirely omit the IVR decision tree and leave a voice message. The voice message is then tokenized into a number of attributes. For example, 'language' for the language spoken in the voice message, 'skill' for a particular ability that will be required of the responding agent, 'nature of a query' for the subject matter or overall issue to be addressed, etc. These tokenized attribute are then routed to call back systems, such as voice or chat system, to select a best suitable agent based on the attributes for responding to the client.

In one embodiment, systems and methods for attribute-based client callbacks are provided. A callback application server transmits prompts and receives requests for client callbacks, an interaction manager determines agent availability and arranges callback handling, and a session management server initiates the callbacks.

An automated system and methods are provided for automating attribute-based callbacks from the contact center to the client. A prompt may be given to the client to leave a voicemail requesting a callback. Attributes tags (e.g., language) may be added to the voicemail as a work item. Automated call-back calling (ACC) may then select an available agent with the appropriate skills based on attributes tag and be connected to service the client.

The systems and methods provide attribute-based client callbacks, wherein a callback application server identifies the attributes, analyze the agent attributes to select agents eligible for the client callbacks, an interaction manager then determines agent availability and arranges callback handling to the client, such as to conduct the call in the client's native or preferred language.

Many businesses use groups of service agents for communicating with clients who start communications with the business, such as by telephone calls. To most efficiently use the time and skills of each service agent, the service agents may be organized into groups based on a skill set and/or language ability. For example, the groupings may be based on the agent's ability to handle client issues such as the opening of new accounts, billing issues, and client service issues on existing accounts and particular language skills.

In one embodiment, a system is disclosed, comprising: a processor having access to a non-transitory memory comprising machine-executable instructions for executable by the processor; a network interface; a data storage; wherein the processor performs: receiving a call via the network interface; recording, from the call, a voice message to the data storage; analyzing the voice message for spoken language; selecting a record, from a pool of records maintain in the data storage, that comprises an agent language attribute matching the spoken language; accessing, from the selected record, an agent communication device identifier; and automatically placing a callback to connect an agent communication device, associated with the agent communication device identifier, with a caller communication device.

In another embodiment, a method is disclosed, comprising: receiving a call via a network interface; recording, from the call, a voice message to a data storage; analyzing the voice message for spoken language; selecting a record, from a pool of records maintain in the data storage, that comprises an agent language attribute matching the spoken language; accessing, from the selected record, an agent communication device identifier; and automatically placing a callback to connect an agent communication device, associated with the agent communication device identifier, with a caller communication device.

In another embodiment, a system is disclosed, comprising: means to receive a call via a network interface; means to record, from the call, a voice message to a data storage; means to analyze the voice message for spoken language; means to select a record, from a pool of records maintain in the data storage, that comprises an agent language attribute matching the spoken language; means to access, from the selected record, an agent communication device identifier; and means to automatically place a callback to connect an agent communication device, associated with the agent communication device identifier, with a caller communication device.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
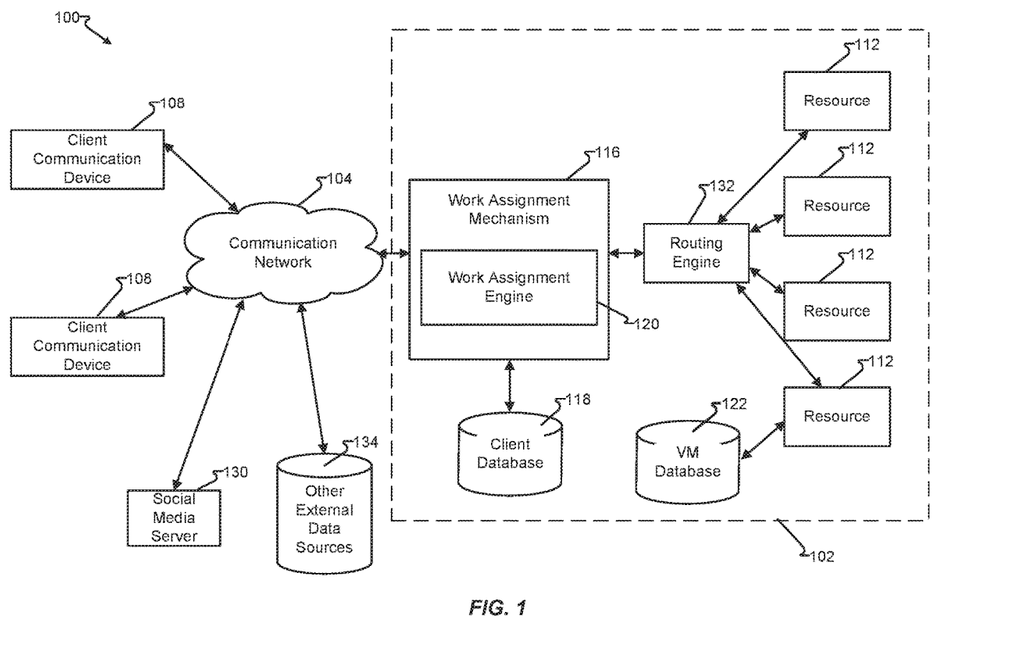
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from client communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to clients for a client of contact center 102).

Furthermore, the border illustrating contact center 102 may be as-illustrated or, in other embodiments, include alterations and/or more and/or fewer components than illustrated. For example, in other embodiments, one or more of resources 112, client database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from clients and/or resources 112) as one means to interact with clients via their client communication device 108.

Client communication devices 108 are embodied as external to contact center 102 as they are under the more direct control of their respective user or client. However, embodiments may be provided whereby one or more client communication devices 108 are physically and/or logically located within contact center 102 and are still considered external to contact center 102, such as when a client utilizes client communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a client of a contact center 102. Other external data sources 134 may include data sources, such as service bureaus, third-party data providers (e.g., credit agencies, public and/or private records, etc.). Clients may utilize their respective client communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to client communication devices. In accordance with at least some embodiments of the present disclosure, a client may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access client database 118, such as to retrieve records, profiles, purchase history, previous work items, and/or other aspects of a client known to contact center 102. Client database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, client communication device 108 is connected to one of resources 112 via components entirely hosted by a cloud-based service provider, wherein processing and data storage hardware components may be dedicated to the operator of contact center 102 or shared or distributed amongst a plurality of service provider clients, one being contact center 102.

In one embodiment, a message is generated by client communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

In another embodiment, contact center 102 comprises voice message database 122 to maintain voice messages left by clients. For example, resource 112 when embodied as an automated agent may provide IVR prompts to a client to leave a message, such as to receive a callback when a suitable human agent is available or can be made available. Prompting a client to leave a message may be challenging if the client does not understand the language. However, an application, such as a webpage or application executing on client communication device 108 may be customized to present suitable prompts in the native language of the client.

Additionally or alternatively, contact center 102 may have a direct voicemail number, which may be published in any more or more languages so it is known that calling that particular number will result in the caller hearing a prompt in a particular language or languages, which they may or may not understand, and a tone to indicate recording has begun. As a further embodiment, resource 112 may be embodied as a human agent utilizing an agent communication device connected to client communication device 108. If the human agent cannot speak the same language as the client, then the call may be forwarded to a voicemail system to allow the client to leave a message to obtain a callback from an agent speaking the client's language.

Figure 2:
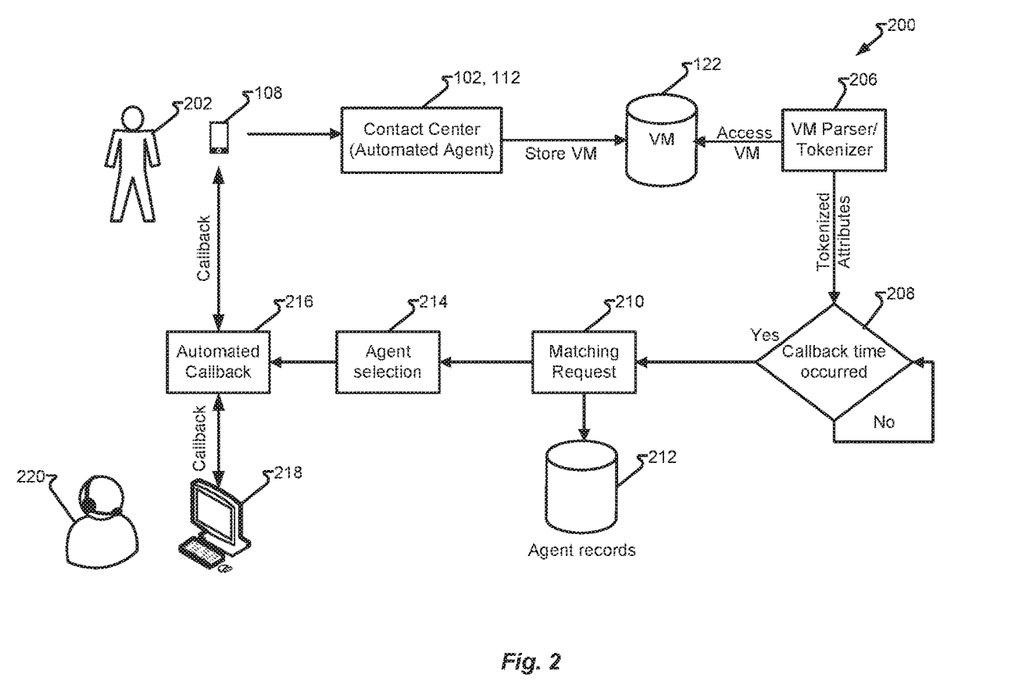
FIG. 2 depicts a process flow in accordance with embodiments of the present disclosure.

FIG. 2 depicts process flow 200 in accordance with embodiments of the present disclosure. In one embodiment, process flow 200 utilizes components and features of system 100 (see FIG. 1). Portions of system 100 are omitted with respect to process flow 200 so as to not overly complicate the figure and associated description. Those of ordinary skill will appreciate that components necessarily required to support the features and components that are described, are implicitly included.

In one embodiment, client 202 utilizes client communication device 108 to call contact center 102. Client communication device 108 is connected to contact center 102, such as to one of resource 112 when embodied as an automated agent. The automated agent prompts client 202 to leave a message, which is then stored in voice message database 122. Then, at a subsequent time, VM parser/tokenizer 206 accesses the voicemail message in voice message database 122 to parse and tokenize the content of the voicemail message. VM parser/tokenizer 206 may determine the language spoken in the voicemail messages as well as any one or more additional attributes. Attributes may include a callback number expressly provided, a callback number provided from caller ID, a requested time for the callback, a requested language different from the language utilized to provide the voicemail message, purpose of the call (e.g., obtain information, provide information, initiate/cancel a transaction, technical assistance, etc.), subject matter, relevant product or service, etc. A token may be created for any one or more of the attributes identified by VM parser/tokenizer 206.

In one embodiment, the tokens of the identified attributes are passed to a call queuing service or component, which may initiate a delay of the callback time in decision 208 to hold the callback until the time requested. If no specific callback time was requested in the voicemail message, callback time decision 208 may be omitted. Next matching request 210 accesses records, such as a pool of records maintained in agent records 212 and selects a record associated with a particular agent (e.g., agent 220) having any required skill (e.g., speaks the requested language identified in a language token). Optional skills or degree of a skill (e.g., expertise with a particular product versus a more limited understanding of the product) may be considered, such as to refine the selection to a specific agent when a plurality of agents is identified having all the required skills.

Agent selection 214 then selects the particular agent and signals automated callback 216 to initiate the callback to connect client communication device 108 (or other device if a different callback number is requested) to agent communication device 218 to enable the callback between client 202 and agent 220.

It should be appreciated that variations in the timing of the events described with respect to process flow 200 may be implemented without departing from the scope of the embodiments. For example, callback time decision 208 may follow agent selection 214. As a further option, if a particular agent 220 is selected for the callback, the callback may be inserted into a work queue at a position designed to trigger the callback at the designated callback time indicated in the callback token.

Figure 3:
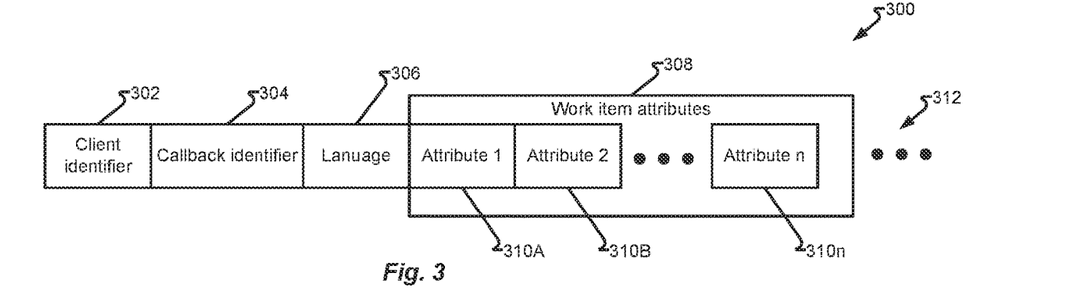
FIG. 3 depicts a first data structure in accordance with embodiments of the present disclosure.

FIG. 3 depicts data structure 300 in accordance with embodiments of the present disclosure. In one embodiment, data structure 300 comprises fields populated with data extracted from a voicemail message, such as may be maintained in voice message database 122. A processor, executing instructions maintained in a non-transitory storage, executes the instructions to parse a particular voicemail message. Additional information may be included from other sources, such as a caller ID number.

Client identifier field 302 maintains an identity of client 202. This may be a full name, partial name, customer number, account number, etc. For example, if the caller is known (e.g., records exist in client database 118) data may be included in client identifier field 302 for the known client. If client 202 is an unknown client, client identifier field 302 may be limited to information provided in the voicemail message (e.g., "my name is . . . ") and optionally a calling record (e.g., the client having a particular caller ID). An identifier may be included in client identifier field 302 (e.g., "New client #1234") as one means to distinguish one client from another. Callback identifier field 304 maintains the callback identifier, which may be parsed from the voicemail message and/or a caller ID. Language field 306 maintains the clients callback preferred or required language, such as the language in which the voicemail message was spoken or, if a different language was expressly requested in the voicemail message. A combination of fields values may be populated with data expressly provided in the voicemail message that differ from the message itself. For example, "I'm calling on behalf of my mother who has a question about one of your products. She only speaks Spanish. Please have someone call her back. Her name is . . . and she can be reached at . . . " Therefore, although the client who left the voicemail message has particular attributes (e.g., speaks English, a particular caller ID, etc.) the attributes maintained in data structure 300 may be associated with a different client and/or attributes.

Optionally work item attribute fields 308 may maintain one or more attribute fields 310, which may be utilized to maintain more specific information, such as a product or service, question, purpose or other information that may be useful to agent 220 during the callback or to prepare (e.g., investigate a particular transaction or event prior to the callback).

In another embodiment, data structure 300 may comprise tokens. However, it another embodiment, data structure 300 may maintain fields that are subsequently covered into tokens (see FIG. 4). As a further option, additional fields may be included as indicated by ellipses 312.

Figure 4:
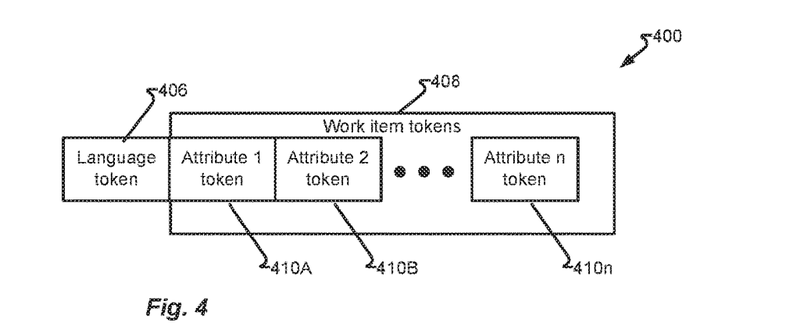
FIG. 4 depicts a second data structure in accordance with embodiments of the present disclosure.

FIG. 4 depicts data structure 400 in accordance with embodiments of the present disclosure. In one embodiment, data structure 400 comprises one or more tokens, which may be extracted directly from a voicemail message maintained in voice message database 122 or via an intermediary data structure, such as attributes maintained in data structure 300. Data structure 400 comprises at least language token field 406 identifying a particular language skill the agent selected for the call back should possess and be expected to utilize during the callback. Optionally, work item tokens 408 comprises one or more tokens of additional attribute tokens 410A-n. Additional attribute tokens 410A-n may comprise product identifiers, particular questions, or other information extracted from the voicemail message and/or data structure 300.

Figure 5:
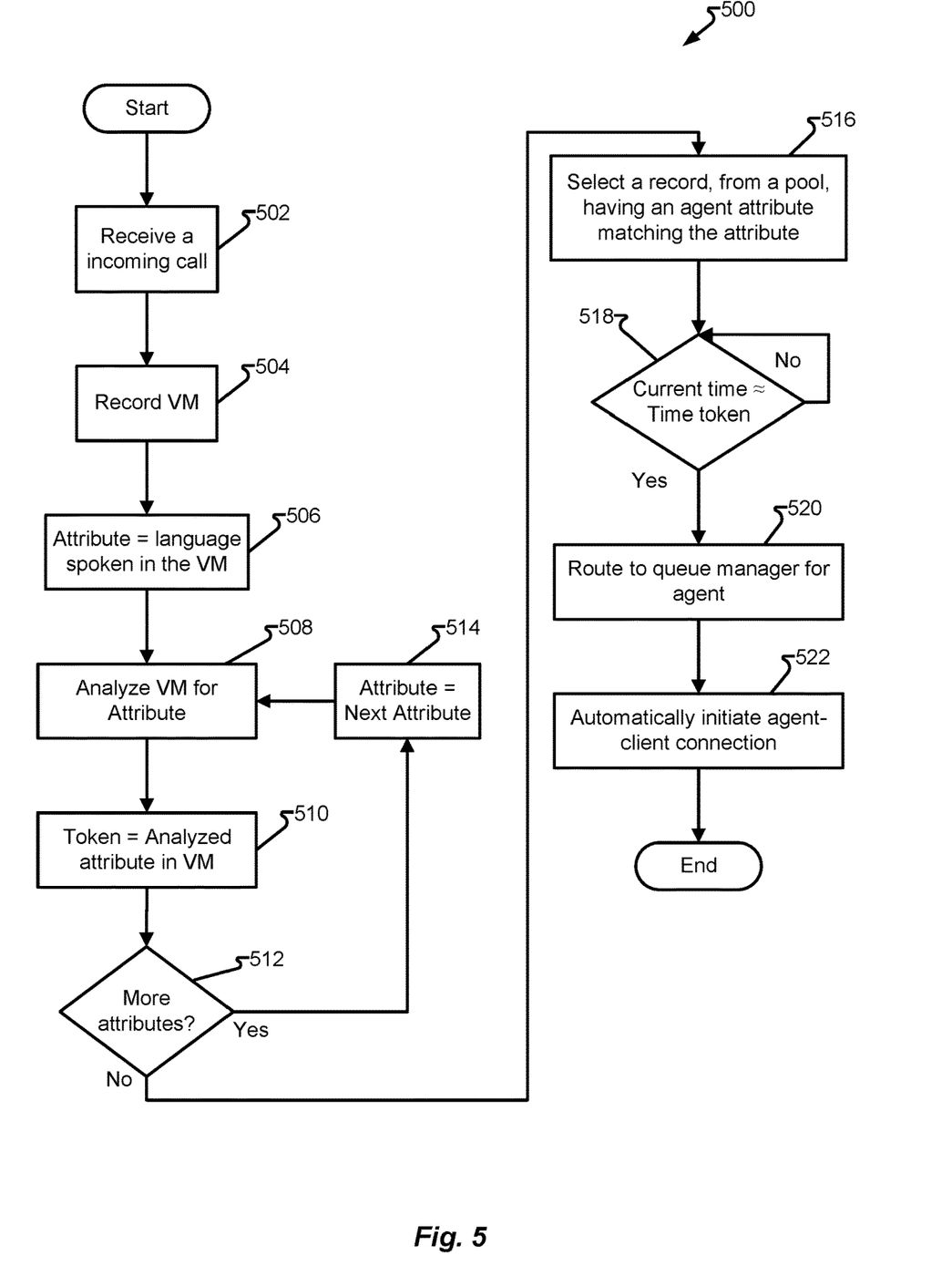
FIG. 5 depicts a process in accordance with embodiments of the present disclosure.

FIG. 5 depicts process 500 in accordance with embodiments of the present disclosure. Process 500 may be encoded as machine-executable instructions maintained in a non-transitory data storage that, when read by a processor or processors, cause the processor(s) to perform the operations described. In on embodiment, process 500 begins and a call is received in step 502. The call is routed to a voicemail system for the caller to leave a message and, in step 504 the voicemail message is recorded and stored, such as in voice message database 122.

In one embodiment, process 500 comprises steps to look for specific attributes, which may then be converted into tokens. In another embodiment, process 500 comprises steps to parse a voicemail recording for any attributes that may be captured by the voicemail message itself and/or associated records (e.g., caller ID, time/day of the call in which the voicemail message was recorded). In the absence of content within the voicemail message providing certain information, the associated records may be utilized. For example, if a message requested a callback, but not provide a number, the caller ID number may be used. Similarly, if a time or day was not specified for the callback, calling back at a similar time on a subsequent day, which may be further associated with the day being a weekday or weekend, may be utilized.

Step 506 may be the first of one or multiple attributes sought or discovered in a voicemail recording. A first attribute may be the language spoken in the voicemail message. Next, step 508 determines if the language attribute can be identified in the voicemail message, such as by executing a language recognition algorithm. For example, voicemail message may have words that are commonly encountered (e.g., "call" "name" digits comprising a telephone number, etc.) as a means to avoid identifying a particular language without needing to consider each word, which may be performed if necessary. For example, if the word "call" is likely to be encountered (e.g., "I would like a call to discuss . . . ", "Please call me at . . . " etc.) then matching a voicemail spoken words to the word "call" for a number of languages may more quickly reveal the language. If the language is not able to be determined, the call may be processed by a more processor-intensive process, such as to match spoken words to any entry, in any language to develop a likelihood of the voicemail message being in a particular language. For example, one sound might be likely to be a first word in one language, and other sound likely to be a second word in a different language. With more words identified, a profile may be developed to indicate the language. Additionally or alternatively, identified words may be confirmed with a domain. For example, if a particular spoken word has been identified, with less than absolute certainty, to be a particular word, but that word is exceptionally rare for the domain of contact center 102, then the word may be excluded as being misleading or otherwise indicating that the language should not be based on that particular word.

In step 510, a token is created for the particular attribute. The token may a data structure to indicate a particular type of token (e.g., language, subject matter, etc.) that may be passed on to an agent selection mechanism. If test 512 determines there are more attributes to search for or discovered within the voicemail, step 514 is executed where the next attribute is determined and, in step 508, the attribute determined and utilized to populate a token in step 510. If test 512 is determined in the negative, process 500 continues to step 516.

Step 516 selects a record, such as from a pool of records maintain in agent records 212, matching the required tokens. Tokens may be required (e.g., conversational in the spoken language, "product X" expertise level 2 or greater", authority to handle large transactions, etc.) or optional (e.g., native speaker of the spoken language, prefer agent with "product X" expertise to be level 5 or greater). The record selected comprising an agent communication device identifier or index to another record where an agent communication device identifier may be obtained for the selected agent during the time of the callback. If a requested callback time attribute is determined to be specified in the voicemail message, such as in an iteration of step 508 and step 510, then test 518 is implemented to initiate a callback at, or substantially at, the time specified in the time token. What is considered "substantially" equivalent may be specified by the caller (e.g., "between 10:00 and 10:30") or based on a particular standard (e.g., the time specified, plus-or-minus 10 minutes, for travel-related callbacks; the time specified, plus-or-minutes 20 minutes for lost luggage related callbacks, etc.). If test 518 is determined in the negative, then a delay loop or other delay may be implemented until such time as test 518 is determined in the affirmative.

Next, step 520 routes the call to a queue manager to create the callback task within a queue for the selected agent. If no queue is implemented, step 520 may be executed immediately. Then, in step 522, agent communication device 218 of the selected agent 220 is automatically placing a call to the client communication device 108.

Figure 6:
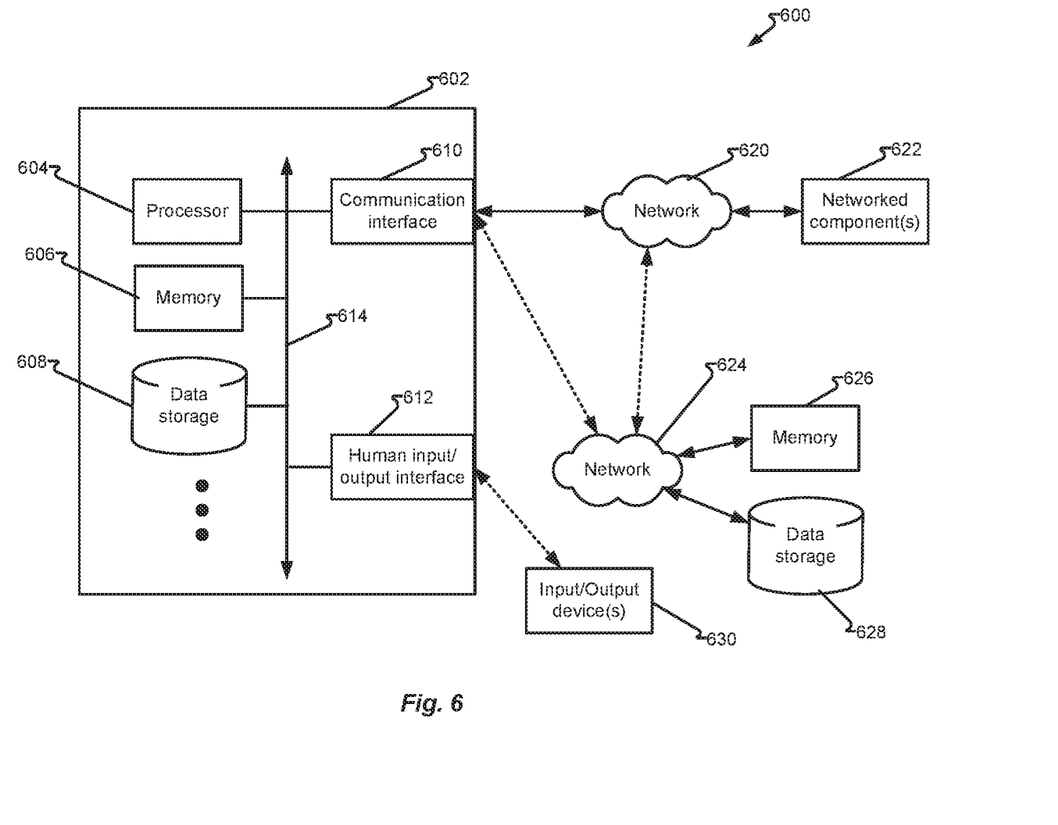
FIG. 6 depicts a second system in accordance with embodiments of the present disclosure.

FIG. 6 depicts device 602 in system 600 in accordance with embodiments of the present disclosure. In one embodiment, agent communication device 218, resource 112, VM parser/tokenizer 206, and/or matching request 210 may be embodied, in whole or in part, as device 602 comprising various components and connections to other components and/or systems. The components are variously embodied and may comprise processor 604. Processor 604 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Communication network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, such as contact center 102, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular client, using a particular client communication device 108, may be enabled (or disabled) with a particular networked component 622 and/or particular resource 112. Similarly, one particular networked component 622 and/or resource 112 may be enabled (or disabled) from communicating with a particular other networked component 622 and/or resource 112, including, in certain embodiments, device 602 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
   a processor having access to a non-transitory memory comprising machine-executable instructions for executable by the processor;
   a network interface;
   a data storage;
   wherein the processor performs:
      receiving a call via the network interface;
      recording, from the call, a voice message to the data storage;
      analyzing the voice message to determine a spoken language;
      analyzing the voice message to determine a work item attribute;
      selecting a record, from a pool of records maintained in the data storage, that comprises an agent language attribute matching the spoken language and the work item attribute;
      accessing, from the selected record, an agent communication device identifier; and
      automatically placing a callback to connect an agent communication device, associated with the agent communication device identifier, with a caller communication device.

2. The system of claim 1, wherein the processor performs the analyzing of the voice message for spoken language, further comprising creation of a token comprising a plurality of fields wherein a first field comprises a value determined in accordance with the spoken language and a second field comprises a value determined in accordance with the work item attribute.

3. The system of claim 2, wherein the processor selecting the record, from the pool of records maintained in the data storage, further comprises selecting the record that comprises the agent language attribute matching the first field.

4. The system of claim 2, wherein the processor further performs the analyzing of the voice message for spoken language to obtain an identifier of the caller communication device and wherein the creation of the token comprises a third field comprising the identifier of the caller communication device.

5. The system of claim 1, wherein the processor further performs:
the analyzing of the voice message for spoken language to obtain a time to place the callback; and
the automatically placing the callback occurs substantially at the time.

6. The system of claim 5, wherein the processor further performs:
the analyzing of the voice message for spoken language to obtain the time to place the callback, further comprises creation of a callback token; and
automatically placing the callback occurs substantially upon the time of the callback token.

7. The system of claim 5, wherein the processor further performs:
analysis of the voice message to obtain the time to place the callback, further comprises creation of a callback token; and
upon occurrence of the time to place the callback, passing the callback token to a queue manager, wherein the queue manager initiates the callback at the time of the callback token.

8. The system of claim 1, wherein the processor further performs:
selecting the record further comprises selecting the record from the pool of records maintained in the data storage, that comprises an agent skill attribute matching the work item attribute.

9. The system of claim 8, wherein the work item attribute comprises one or more of an issue identifier, a product identifier, a service identifier, a skill to resolve a work item, or an authorization attribute required to perform a task to resolve the work item.

10. The system of claim 8, wherein the work item attribute comprises a token associated with the work item attribute and wherein the processor performs the selecting of the record comprising selecting the record from the pool of records maintained in the data storage, that comprises an agent skill attribute matching the token associated with the work item attribute.

11. A method comprising:
receiving a call via a network interface;
recording, from the call, a voice message to a data storage;
analyzing the voice message to determine a spoken language;
analyzing the voice message to determine a work item attribute;
selecting a record, from a pool of records maintained in the data storage, that comprises an agent language attribute matching the spoken language and the work item attribute;
accessing, from the selected record, an agent communication device identifier; and
automatically placing a callback to connect an agent communication device, associated with the agent communication device identifier, with a caller communication device.

12. The method of claim 11, wherein analyzing of the voice message for spoken language, further comprising creation of a token comprising a plurality of fields wherein a first field comprises a value determined in accordance with the spoken language and a second field comprises a value determined in accordance with the work item attribute.

13. The method of claim 12, wherein the selecting the record, from the pool of records maintained in the data storage, further comprises selecting the record that comprises the agent language attribute matching the first field.

14. The method of claim 12, wherein the analyzing of the voice message for spoken language further obtains an identifier of the caller communication device and wherein the creation of the token comprises a third field comprising the identifier of the caller communication device.

15. The method of claim 11, further comprising:
analyzing the voice message for spoken language to obtain a time to place the callback; and
the automatically placing of the callback occurs substantially at the time.

16. The method of claim 15, wherein:
the analyzing of the voice message for spoken language to obtain the time to place the callback, further comprises creating a callback token; and
wherein automatically placing the callback occurs substantially upon the time of the callback token.

17. The method of claim 11,
wherein the selecting the record further comprises selecting the record from the pool of records maintained in the data storage, that comprises an agent skill attribute matching the work item attribute.

18. The method of claim 17, wherein the work item attribute comprises one or more of an issue identifier, a product identifier, a service identifier, a skill to resolve a work item, or an authorization attribute required to perform a task to resolve the work item.

19. The method of claim 18, wherein:
the analyzing of the voice message to obtain the work item attribute further comprises creating a token associated with the work item attribute; and
the selecting of the record comprising selecting the record from the pool of records maintained in the data storage, further comprises selecting an agent skill attribute matching the token associated with the work item attribute.

20. A system, comprising:
means to receive a call via a network interface;
means to record, from the call, a voice message to a data storage;
means to analyze the voice message to determine a spoken language;
means to analyze the voice message to determine a work item attribute;
means to select a record, from a pool of records maintained in the data storage, that comprises an agent language attribute matching the spoken language and the work item attribute;
means to access, from the selected record, an agent communication device identifier; and
means to automatically place a callback to connect an agent communication device, associated with the agent communication device identifier, with a caller communication device.

* * * * *

UNITED STATES PATENT AND TRADEMARK OFFICE
CERTIFICATE OF CORRECTION

PATENT NO. : 11,405,506 B2
APPLICATION NO. : 16/915573
DATED : August 2, 2022
INVENTOR(S) : Manish Dusad and Kazim Hussain It is certified that error appears in the above-identified patent and that said Letters Patent is hereby corrected as shown below:

In the Claims

At Column 20, Line 20, please delete "for spoken language" therein.

Signed and Sealed this
Eleventh Day of October, 2022

Katherine Kelly Vidal
*Director of the United States Patent and Trademark Office*